Figure 1:
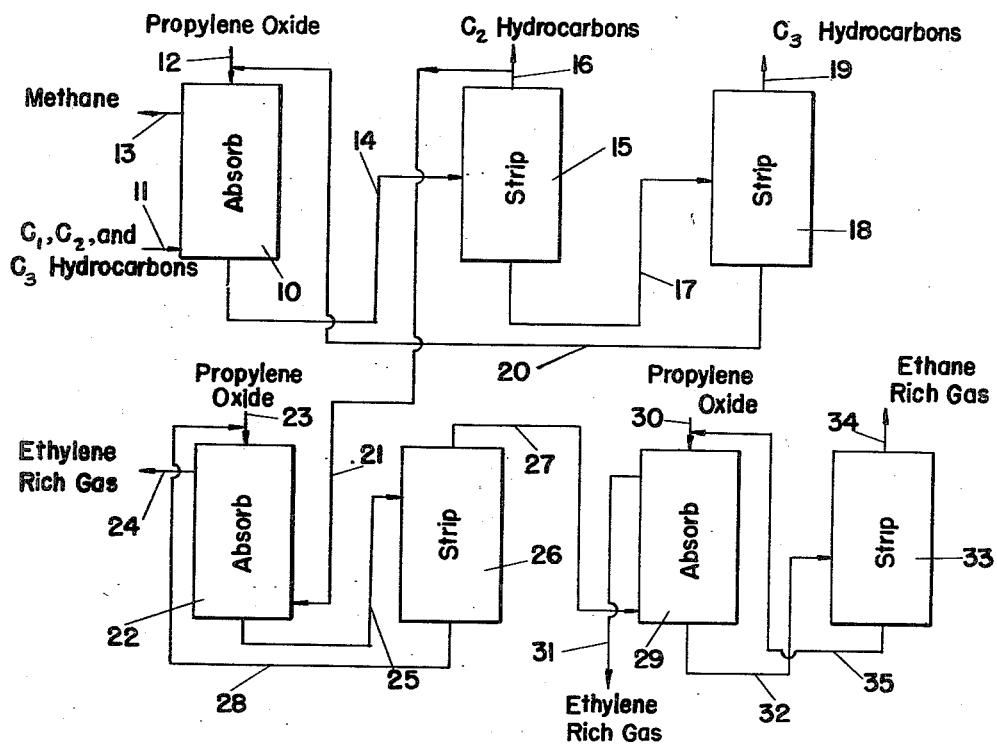

United States Patent Office 2,815,827
Patented Dec. 10, 1957

2,815,827

SEPARATION OF GASES

James L. Jezl, Swarthmore, and Arthur T. Polishuk, Media, Pa., assignors to Sun Oil Company, Philadelphia, Pa., a corporation of New Jersey Application June 18, 1956, Serial No. 592,206

4 Claims. (Cl. 183—115)

This invention relates to the separation of gases, and more particularly to the separation of ethylene from ethane in mixtures of gases containing those components.

The process according to the present invention is particularly advantageous in the production of fractions enriched in ethylene or ethane from mixtures of gases having 1 to 3 carbon atoms per molecule, as obtained from natural gas or petroleum. Commonly, mixtures containing methane, ethane, ethylene and various hydrocarbons having 3 carbon atoms per molecule, are available which would provide a suitable source for ethylene or ethane, in the event that a satisfactory method were available for separating the mixture into the desired components.

According to the present invention, fractions enriched in ethylene and ethane respectively are obtained from gaseous mixtures containing ethylene and ethane, or mixtures containing those components and other gases also.

The process according to the invention involves contacting a gasous mixture containing ethylene and ethane with an alkylene oxide having 2 to 4 carbon atoms at a pressure of at least 200 pounds per square inch absolute, thereby to obtain an alkylene oxide phase containing dissolved gases which are enriched with regard to ethane, the undissolved gases obtained from the contacting being enriched in ethylene. The process will be further described with reference to propylene oxide as the alkylene oxide used as selective solvent, though ethylene oxide and butylene oxide can also be employed.

The process according to the invention can be carried out by operating under conditions such that a portion only of the gases contacted with the propylene oxide becomes dissolved therein, the dissolved gases being enriched in ethane. Alternatively, conditions can be employed such that initially all of the gases contacted with the propylene oxide are dissolved therein, the resulting propylene oxide being subsequently subjected to conditions, e. g. increased temperature or reduced pressure, such that a portion of the dissolved material is stripped out of the propylene oxide, the remaining dissolved material being enriched in ethane. Combinations of selective dissolving followed by selective stripping can also be employed.

The process according to the invention is carried out at a pressure of at least 200 p. s. i. a., since liquid propylene oxide has selective solvent action for ethane at such elevated pressures, whereas at lower pressures any selectivity which may exist is not sufficiently great to provide satisfactory separation. Preferably, the pressure employed is not substantially greater than 1000 p. s. i. a., and preferred pressures are those within the approximate range from 400 to 600 p. s. i. a.

In one embodiment of the invention, the starting material for the process contains various gaseous hydrocarbons having 1, 2 and 3 carbon atoms per molecule. In a first step, the gas mixture is contacted with liquid propylene oxide at a pressure in the approximate range of 100 to 400 p. s. i. a., in order to selectively dissolve hydrocarbons having 2 and 3 carbon atoms per molecule, methane being substantially undissolved. Hydrocarbons having 2 carbon atoms per molecule are then stripped from the propylene oxide, and finally hydrocarbons having 3 carbon atoms per molecule are stripped from the propylene oxide, the latter then being recycled to the first stage of the process. The hydrocarbons having 2 carbon atoms per molecule, after stripping from the propylene oxide, are contacted with additional propylene oxide at a pressure of at least 200 p. s. i. a. in order to selectively dissolve ethane, ethylene being concentrated in the undissolved gases.

The process according to the invention can advantageously be performed in a plurality of stages for the separation of ethylene from ethane. In such operation, the ethane-enriched solute from the first stage can be contacted with propylene oxide in a second stage to accomplish further enrichment in ethane; further stages can be employed if desired until substantially pure ethane is obtained. Similarly, the ethylene-enriched undissolved material from the first stage can in some cases be contacted with additional propylene oxide in a second stage to obtain undissolved gases still further enriched in ethylene; the extent of purification of ethylene at a given pressure is limited, however, by the composition from which equal amounts of ethylene and ethane are dissolved at that pressure.

A preferred manner of contacting propylene oxide with gases according to the invention is by means of a countercurrent scrubbing tower, having for example 5 to 10 absorption stages. Any suitable design for such scrubbing towers can be employed.

In the event that product gases obtained according to the invention contain entrained propylene oxide, the propylene oxide can readily be removed by scrubbing the gases with water in order to dissolve the propylene oxide in the water.

Figure 2:
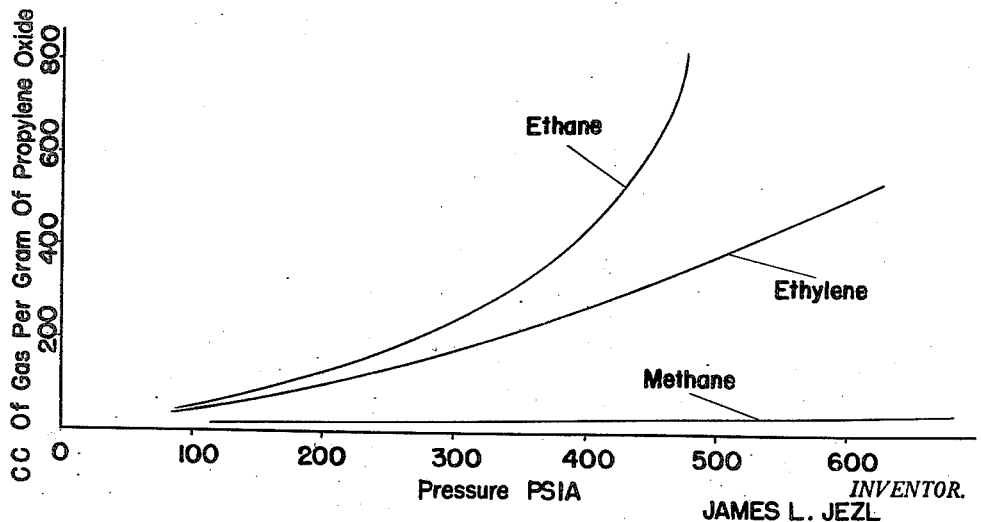

The invention will be further described with reference to the attached drawing, wherein Figure 1 is a schematic flowsheet of a process according to one embodiment of the invention, and Figure 2 is a graph showing the effect of pressure upon the solubilities of methane, ethane and ethylene in liquid propylene oxide.

Referring to Fig. 1, a gaseous mixture containing hydrocarbons having 1, 2 and 3 carbon atoms per molecule is introduced into an absorbing zone 10 through line 11. Propylene oxide is introduced into zone 10 through line 12, and is contacted in zone 10 wtih the rising gases, thereby to selectively dissolve hydrocarbons having 2 and 3 carbon atoms in the propylene oxide. Undissolved methane is withdrawn through line 13. Propylene oxide is passed through line 14 from zone 10 into stripping zone 15, wherein the hydrocarbons having 2 carbon atoms per molecule are stripped and removed through line 16. The propylene oxide is then passed through line 17 into stripping zone 18, wherein the hydrocarbons having 3 carbon atoms per molecule are stripped and removed through line 19. The propylene oxide is then recycled through line 20 to absorbing zone 10.

The mixture of ethylene and ethane removed from stripping zone 15 through line 16 is passed through line 21 into absorbing zone 22, wherein it is countercurrently contacted with liquid propylene oxide introduced through line 23. The contacting in zone 22 is performed for example at a pressure of about 500 p. s. i. a., whereby a highly selective dissolving of ethane in the propylene oxide occurs. Ethylene-enriched gas is withdrawn from zone 22 through line 24. Propylene oxide containing dissolved ethane is introduced through line 25 to stripping zone 26, wherein the dissolved ethane is stripped and removed through line 27, the propylene oxide being recycled through line 28 through zone 22.

Further purification of ethane is obtained by introduction of the ethane-enriched gases through line 27 into absorbing zone 29, wherein the gases are contacted with additional propylene oxide introduced through line 30. The contacting conditions may be essentially the same in zone 29 as in zone 22. Ethylene-enriched gases are removed through line 31, and propylene oxide containing gases further enriched in ethane are introduced through line 32 into stripping zone 33, wherein ethane-enriched gases are stripped and removed through line 34, propylene oxide being recycled through line 35 to zone 29.

Referring to Fig. 2, the solubilities of ethane, ethylene and methane in liquid propylene oxide at ordinary temperature, without heating, are shown for various pressures between 100 p. s. i. a. and 600 p. s. i. a. The graph shows that at pressures below 200 p. s. i. a., the difference in solubility between ethylene and ethane is quite small, so that a satisfactory separation of the two gases by selective dissolving in propylene oxide is not feasible at such lower pressures. However, at higher pressures, there is a marked diversion of the curves for ethane and ethylene, so that at higher pressures, the differential solubility is very much greater, permitting a satisfactory separation by selective dissolving.

At pressures below 100 p. s. i. a., the curves for ethane and ethylene may actually cross, so that ethylene has greater solubility at the lower pressures. However, the differential solubility between ethylene and ethane at such lower pressures is not sufficient to provide satisfactory separation by selective dissolving.

The invention claimed is:

1. Process for separating ethylene from ethane which comprises contacting a gaseous mixture containing ethane and ethylene with liquid alkylene oxide having 2 to 4 carbon atoms at a pressure of at least 200 p. s. i. a., and recovering a liquid alkylene oxide phase enriched in ethane and an undissolved gas phase enriched in ethylene.

2. Process for separating ethylene from ethane which comprises contacting a gaseous mixture containing ethane and ethylene with liquid propylene oxide at a pressure of at least 200 p. s. i. a., and recovering a liquid propylene oxide phase enriched in ethane and an undissolved gas phase enriched in ethylene.

3. Process according to claim 2 wherein ethane enriched gases are stripped from the propylene oxide phase and contacted with liquid propylene oxide at a pressure of at least 200 p. s. i. a., thereby to obtain a liquid propylene oxide phase which is further enriched in ethane.

4. Process for separating gaseous mixtures containing hydrocarbons having 1, 2 and 3 carbon atoms per molecule which comprises contacting a gaseous mixture containing methane, ethane, ethylene and hydrocarbons having 3 carbon atoms per molecule with liquid propylene oxide, thereby to selectively dissolve ethane, ethylene and hydrocarbons having 3 carbon atoms per molecule, selectively stripping a mixture of ethane and ethylene from the propylene oxide, and contacting the mixture of ethane and ethylene with liquid propylene oxide at a pressure of at least 200 p. s. i. a., thereby to obtain a propylene oxide phase enriched in ethane.

References Cited in the file of this patent

"Condensed Chemical Dictionary," 4th edition, Reinhold Publishing Co., 1950, page 549.